United States Patent [19]

Kitson

[11] Patent Number: 5,053,129
[45] Date of Patent: Oct. 1, 1991

[54] FILTER DEVICE

[76] Inventor: Ralph W. Kitson, 5 D Great Meadow Dr., East Hanover, N.J. 07936

[21] Appl. No.: 534,520

[22] Filed: Jun. 6, 1990

[51] Int. Cl.[5] ............................................. B01D 29/00
[52] U.S. Cl. .................................... 210/232; 210/443; 210/450; 210/453; 210/455; 210/493.1; 210/497.01; 210/499
[58] Field of Search ............... 210/232, 352, 440, 443, 210/453, 493.1, 499, 435, 450, 455, 497.01

[56] References Cited

U.S. PATENT DOCUMENTS

| | | | |
|---|---|---|---|
| 1,095,198 | 5/1914 | Finch | 210/453 |
| 1,741,705 | 12/1929 | Liddell | 210/443 |
| 2,076,935 | 4/1937 | Burckhalter | 210/499 |
| 2,183,616 | 12/1939 | Korte | 210/443 |
| 2,253,686 | 8/1941 | Burckhalter | 210/443 |
| 3,007,579 | 11/1961 | Pall | 210/493.1 |
| 3,207,311 | 9/1965 | Kasten | 210/352 |
| 4,817,437 | 4/1989 | Dennis et al. | 210/352 |

FOREIGN PATENT DOCUMENTS 401287 10/1933 United Kingdom ............. 210/493.1

Primary Examiner—Peter Hruskoci
Assistant Examiner—Robert James Popovics
Attorney, Agent, or Firm—Ribis, Graham & Curtin

[57] ABSTRACT

A filter device having a cleanable filter element for use in an oil burner system is provided. The filter device has a housing having a chamber with inlet and outlet passages and has a filter element made of stainless steel cleanable wire woven mesh. The filter element has nylon end caps and divides the chamber into an outer annular inlet space and an inner central outlet space. The filter element end cap configuration allows the filter to be used in many different housings since the end cap has a number of specific, calculated, mating surfaces to receive each housing contact surface. A helical compression spring disposed within the filter element applies radial outward forces on the sides of the mesh cylinder to prevent collapsing of the filter element due to differential pressure caused by dirt accumulation.

3 Claims, 4 Drawing Sheets

FILTER DEVICE

The invention relates to a filter device and, in particular, the invention relates to an interchangable, cleanable oil burner filter with a collapsing preventive spring.

BACKGROUND OF THE INVENTION

The prior art filter device includes a housing subassembly and a filter subassembly, disposed about a common axis, the filter subassembly having a perforated tube wrapped with heavy twine or non-woven or woven fabric, which separates an inlet space from an outlet space. One problem with the prior art filter device is that the filter cannot be easily cleaned. Another problem is that the filter element has to be disposed of in accordance with a procedure of an agency of the Government. A further problem is that each of the many available housings require its own element configuration which necessitates large inventories to meet the requirements of each manufacturer.

SUMMARY OF THE INVENTION

According to the present invention, a filter device is provided. This filter device includes a housing subassembly and a filter subassembly disposed about a common axis; the filter assembly comprising, a lower end cap, and an upper end cap coaxially spaced from the lower end cap and a cylindrical flexible woven sheet disposed axially between the end caps and disposed radially between an inlet space and outlet space, and a helical compression spring disposed axially between the end caps for preventing collapsing of the cylindrical flexible woven sheet.

By using the cylindrical flexible woven sheet, the filter can be removed and cleaned with bio-degradable materials to remove the contaminants which are on the inlet side of the sheet.

The foregoing and other objects, features, and advantages will be apparent from the following description of the preferred embodiment of the invention as illustrated in the accompanying drawings.

DESCRIPTION OF THE PREFERRED EMBODIMENT

Figure 1:
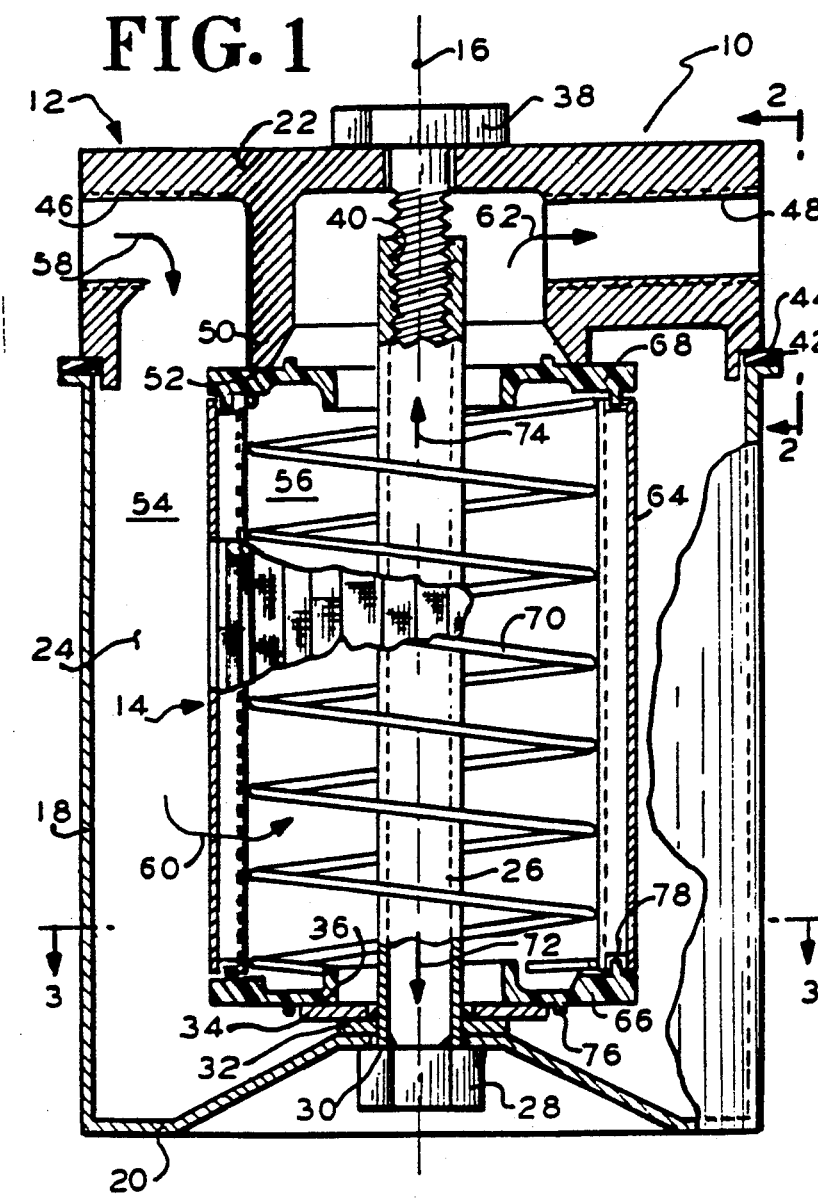
FIG. 1 is a section view of a filter device according to the invention.

As shown in FIG. 1, a filter device 10 is provided for use in an oil burner system. Device 10 includes a housing subassembly 12 and a filter subassembly 14. Subassemblies 12, 14 are coaxial along axis 16.

Housing 12 includes a peripheral wall 18, a bottom wall 20, and a top wall 22, which together enclose a chamber 24. Peripheral wall 18 and bottom wall 20 are a formed, integral unit. Top well 22 is a casting.

Bottom wall 20 has tube 26, which is welded to a bolt head 28. Tube 26 extends through a hole 30 in bottom wall 20. Tube 26 has an integral, welded washer 32 and has a loose washer 34. Washer 32 bears against bottom wall 20. Washer 34 has a circular bearing surface 36. Tube 26 is cantilevered from and supported by bottom wall 20. Tube 26 is disposed coaxially inside chamber 24. Tube 26 engages a threaded top bolt 38. Tube 26 has an internal thread 40 which engages and receives top bolt 38. Top bolt 38 can be tightened for assembling top wall 22 to peripheral wall 18.

Peripheral wall 18 has a ring-shaped assembly joint surface 42, which has a seal ring 44. Seal ring 44 is compressed when top bolt 38 is tightened during an assembly of walls 18, 22.

Figure 2:
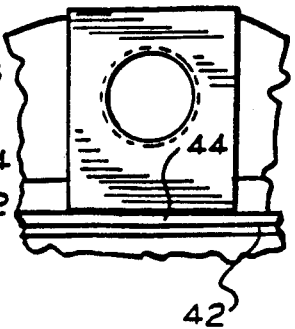
FIG. 2 is a section view taken along line 2—2 of FIG. 1.

As shown in FIG. 2, top wall 22 has a threaded inlet passage 46 and a threaded outlet passage 48. Top wall 22 also has a circular internal collar 50, which has a circular bearing surface 52.

Filter subassembly 14 divides chamber 24 into an annul or inlet space 54 and a central outlet space 56. Oil or a like fluid, flows in a direction 58 through inlet passage 46 and inlet space 54. Then the oil flows in a direction 60 through filter subassembly 14 and outlet space 56. Then, the oil flows in a direction 62 through outlet passage 48.

Filter subassembly 14 includes a cylindrical corrugated filter element 64, a lower end cap 66, an upper end cap 68, and a helical compression spring 70 which applies pressure to prevent lateral collapse of the filter element.

During an assembly of filter, subassembly 14, bolt 38 is tightened. This tightening of the compressor seal ring 44 also applies clamping forces on caps 66, 68.

Figure 4:
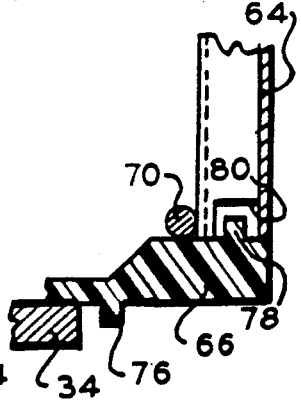
FIG. 4 is an enlarged view of a portion of FIG. 1.
Figure 3:
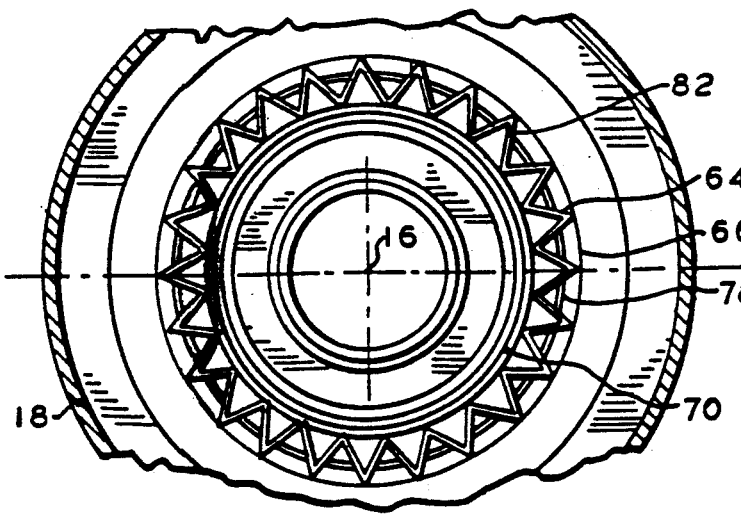
FIG. 3 is a section view taken along line 3—3 of FIG. 1.

As shown in FIGS. 3 and 4, lower cap 66 has an outer circular projection 76 for aligning cap 66. Lower cap 66 also has an inner circular projection 78 for receival in a circular groove 80 in the edge of element 64. Element 64 has a circular series of folded longitudinal portions 82. The materials are indicated hereafter. Helical spring or support 70 is made of a suitable supporting material such as spring steel. Filter element 64 is made of a selective weave mesh made from a material which can be readily cleaned such as woven stainless steel. Caps 66, 68 can be made by molding, stamping, casting or machining and can be made of nylon, other plastics, zinc, aluminum, steel and the like. Seal ring 44 is made of a rubber-like or elastomeric material. Utilizing a softer nylon for the cap the nylon takes the shape of any rough edges on the housing seat so that a tight seal is always obtained. No gaskets are required.

The design of the end caps allows the filter element to be utilized in many different housings. The filter element will mate with the various housings even though each housing model has a different size or shape mating device. The only variation in the filter element would be in its height when a longer or shorter filter element is required.

Figure 5:
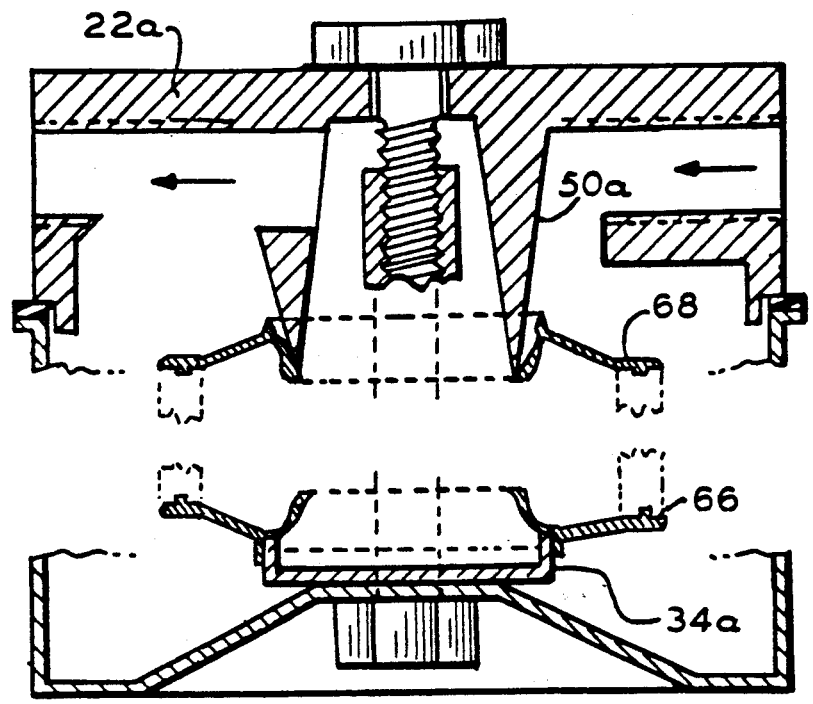
FIGS. 5 to 9 are illustrations in section of different types of filter containers or housings.
Figure 6:
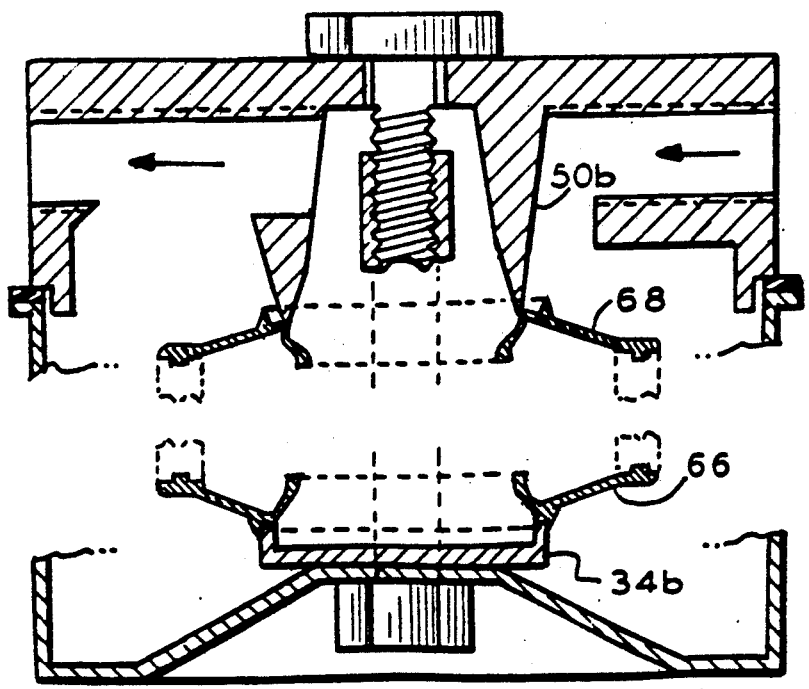
Figure 7:
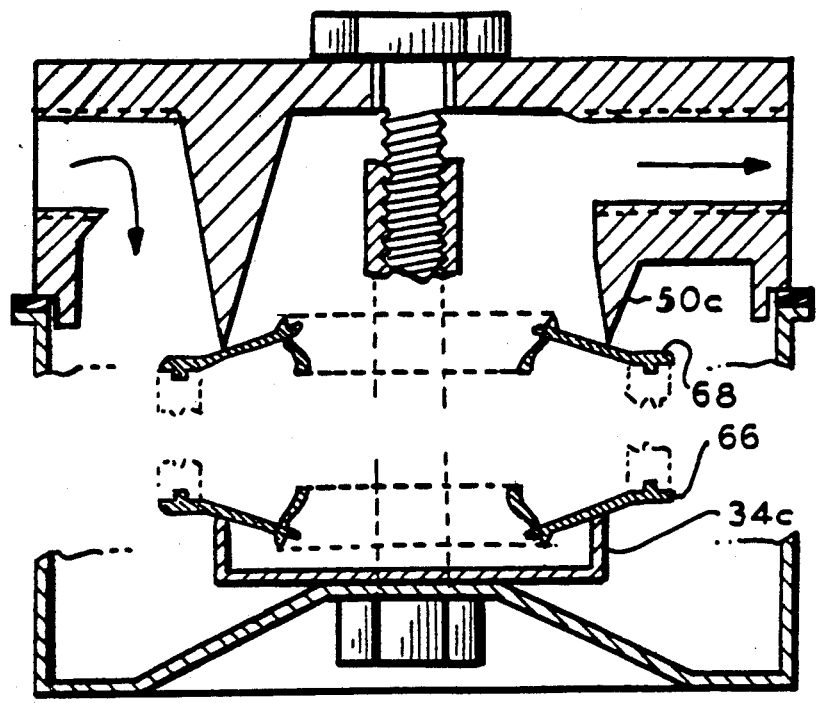
Figure 8:
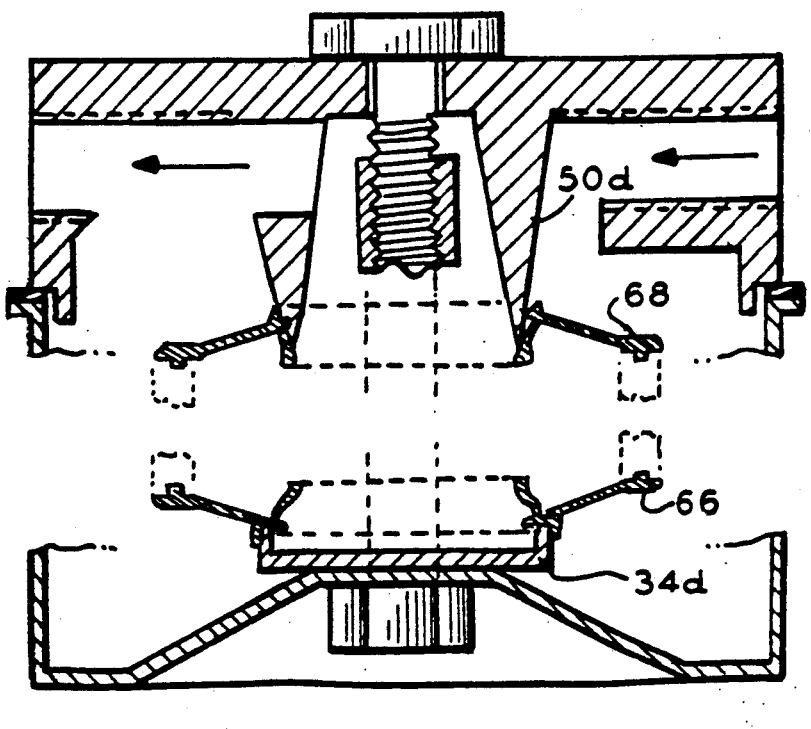
Figure 9:
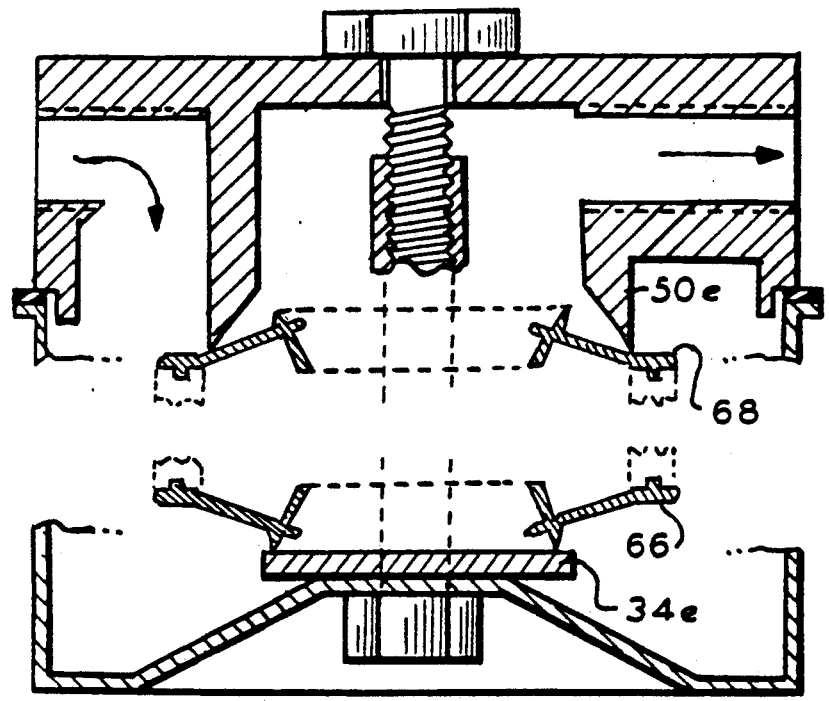

FIGS. 5 to 9 illustrate various types of filter housings showing how the same type of end cap 68 accommodates all of the configurations. Similar function parts have the same number as shown in the other Figures with the addition of a letter suffix to indicate its different construction. In FIG. 5 the circular internal collar is indicated as 50a and contacts the cap 68 at its inner circular dimension. In FIG. 6 the circular internal collar 50b is similar in construction to collar 50a except that it contacts the cap 68 on its upper ridge. In FIG. 7 the circular internal collar 50c contacts the upper surface of the cap 68. In this Figure the lower cap 66 is contacted by the lower end cap 66 by washer 34c. In FIG. 8 the circular internal collar 50d is similar in construction to collar 50a except that it contacts the cap 68 on its upper, outwardly extending flange. In FIG. 9 the circular internal collar 50e is of a slightly different construction as collar 50d having blunted lower ends but it contacts the cap 68 on its upper, outwardly extending flange. In all of these FIGS. 5 through 9 the lower washer 34 is indicated by the same suffix letter as the collar 50.

The advantages of filter device 10 are indicated hereafter.

A) Filter element 64 is a cleanable, replaceable filter element.

B) Filter element 64 provides a better quality of filtration as compacted to the prior art filter element.

C) End caps 66, 68 which are identical in construction, permit installation in housing subassembly 12 with either end facing upwardly thereby avoiding installation error.

D) End caps 66, 68 have many specific mating surfaces permitting the filter element to be installed in a variety of different housing constructions.

E) The filter element of the invention is a cleanable, long life filter element which replaces the throw away types presently utilized. Utilizing stainless steel wire mesh cloth and nylon end caps will never rust and a coated inner spring gives the filter great strength to prevent collapsing. Further since both caps are the same configuration and a nylon pilot guides the filter into place thereby allowing it to be readily installed by unskilled mechanics.

F) End caps 66, 68 permit fluid tight sealing thereby avoiding the use of additional sealing features.

G) Helical Spring 70 prevents collapse of element 64 under severe differential pressure.

H) Disposal of waste oil and oil contaminates, and used elements, according to procedures of the Environmental Protection Agency of the U.S. Government are minimized.

I) The maintenance cost of filter device 10, as compared to the prior art filter device, is minimized. While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A filter device comprising:
   a housing subassembly having an inlet passage and an outlet passage and a chamber and an axis;
   a filter subassembly coaxially disposed within the chamber and dividing the chamber into an inlet space connecting to the inlet passage and an outlet space connecting to the outlet passage;
   the filter subassembly having a lower end cap and an upper end cap and a cylindrical filter mesh element covered at its ends by the end caps and having a helical compression spring disposed inside the cylindrical filter mesh element and bearing against the sides of the cylinder; and the helical spring applying forces around the circumference of the filter element in order to avoid collapsing of the cylindrical filter mesh element, wherein
   the cylindrical filter mesh element in a corrugated element having longitudinal axial-parallel fold portions, and
   the housing subassembly has a bottom wall and a top wall and a peripheral wall enclosing the chamber;
   the bottom wall having a tubular bolt fixedly connected thereto and cantilevered therefrom along the axis;
   the top wall having a hole receiving a top bolt which is threaded into the tubular bolt;
   the top wall having a cylindrical bearing surface engaging a circular portion of the upper end cap;
   the bottom wall having a cylindrical bearing surface engaging a circular portion of the upper end cap;
   the bottom wall having a cylindrical bearing surface engaging a circular portion of the lower end cap; and
   the peripheral wall having a circular assembly joint with the top wall and having a compressible ring seal in the circular assembly joint.

2. The subassembly of claim 1, wherein the lower end cap is identical to the upper end cap for assembly in the housing subassembly with either end upward.

3. The subassembly of claim 2, wherein
   the lower end cap has a circular outer projection for coaxially aligning the end-cap with an adjacent portion of the housing subassembly.

* * * * *